United States Patent [19]
Vdoviak et al.

[11] 3,750,402
[45] Aug. 7, 1973

[54] MIXED FLOW AUGMENTATION SYSTEM

[75] Inventors: John W. Vdoviak; Samuel A. Belk; Barry Weinstein, all of Cincinnati, Ohio

[73] Assignee: General Electric Company, Cincinnati, Ohio

[22] Filed: Aug. 7, 1963

[21] Appl. No.: 300,432

[52] U.S. Cl.................................. 60/261, 60/262
[51] Int. Cl............................................ F02k 3/10
[58] Field of Search..................... 60/35.6, 261, 262

[56] References Cited
UNITED STATES PATENTS

| | | | |
|---|---|---|---|
| 2,929,203 | 3/1960 | Henning, Jr. et al. | 60/35.6 |
| 2,934,895 | 5/1960 | Gregory et al. | 60/35.6 |
| 2,975,589 | 3/1961 | Vdoviar | 60/35.6 |
| 2,978,865 | 4/1961 | Pierce | 60/35.6 |
| 2,979,900 | 3/1961 | Hopper | 60/35.6 |
| 3,043,101 | 7/1962 | Lefebrre et al. | 60/35.6 |
| 3,048,376 | 8/1962 | Howald et al. | 60/35.6 |

Primary Examiner—Samuel Feinberg
Attorney—Thomas J. Bird, Jr., Lee H. Sachs, Oscar B. Waddell, Frank L. Neuhauser, Derek P. Lawrence and Joseph B. Forman

EXEMPLARY CLAIM

1. In an axial flow reaction engine a mixed flow augmentation system comprising:

a first plurality of motive fluid flow passages;

a second plurality of motive fluid flow passages, the passages of said first and second pluralities having openings interspersed in circumferential alternation about the axis of the engine; and a plurality of radially-extending flow blockage members located entirely within the flow passages of said second plurality upstream of the openings thereof, wherein the plane of maximum aerodynamic flow blockage of said members is co-planar with the plane of static pressure balancing between the motive fluid streams of said first and second pluralities of flow passages, respectively, to facilitate flow mixing and combustion stability in said mixed flow augmentation system.

10 Claims, 11 Drawing Figures

INVENTORS.
JOHN W. VDOVIAK
SAMUEL A. BELK
BARRY WEINSTEIN

BY- Harry C. Burgess
ATTORNEY-

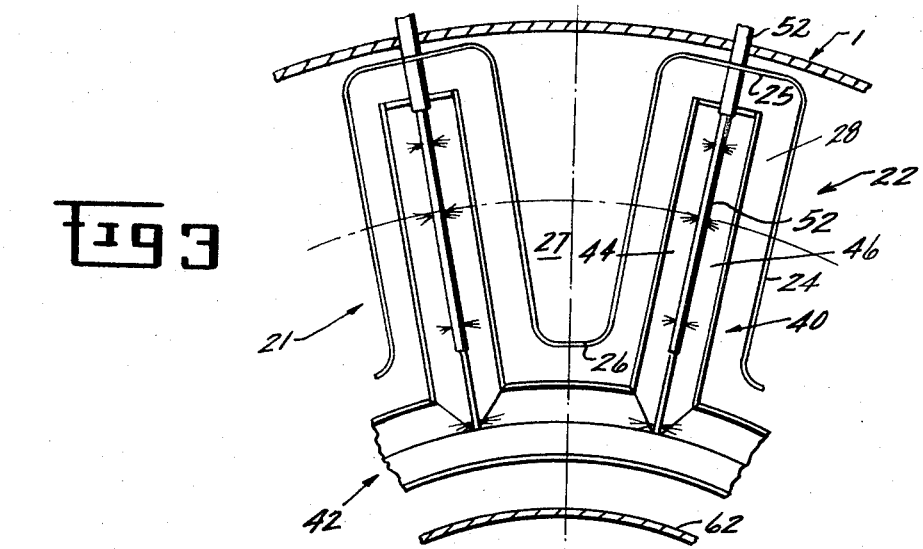
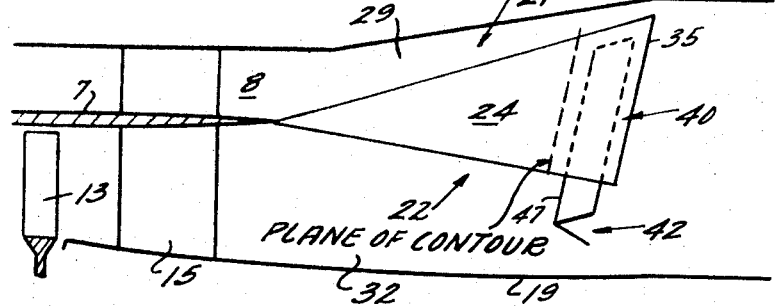
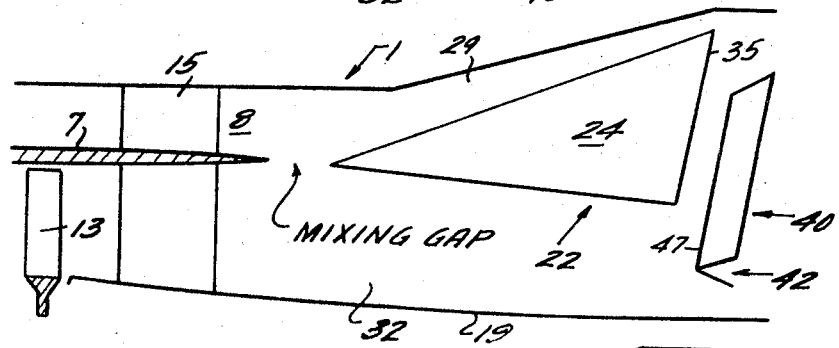
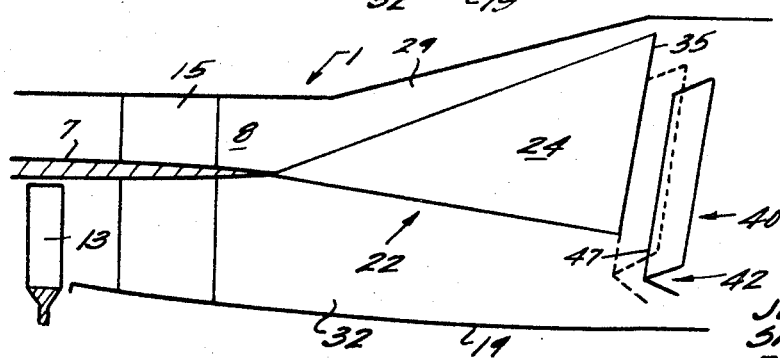

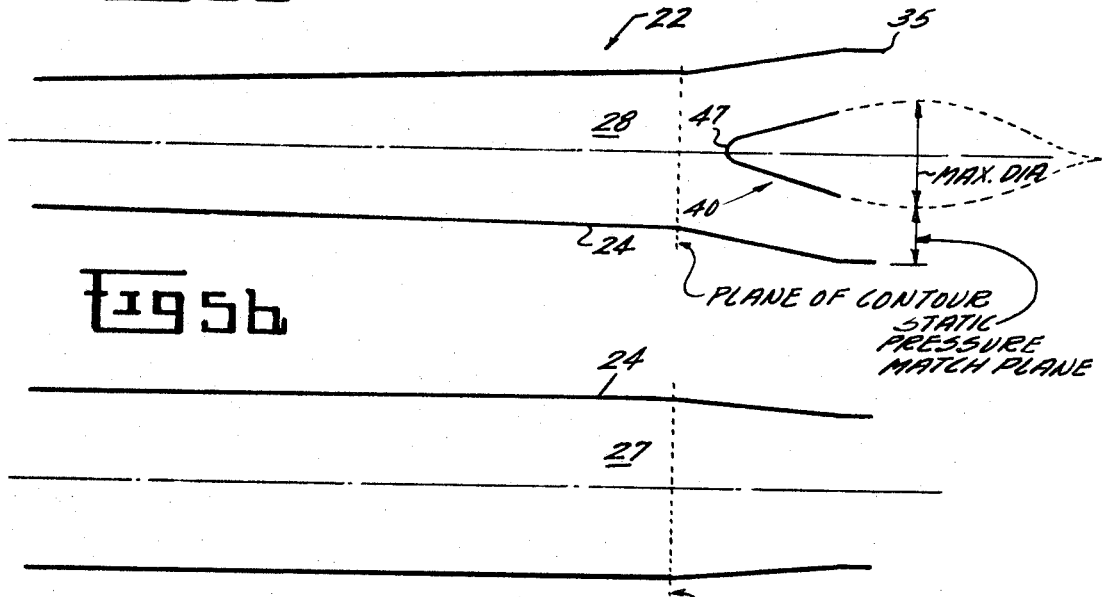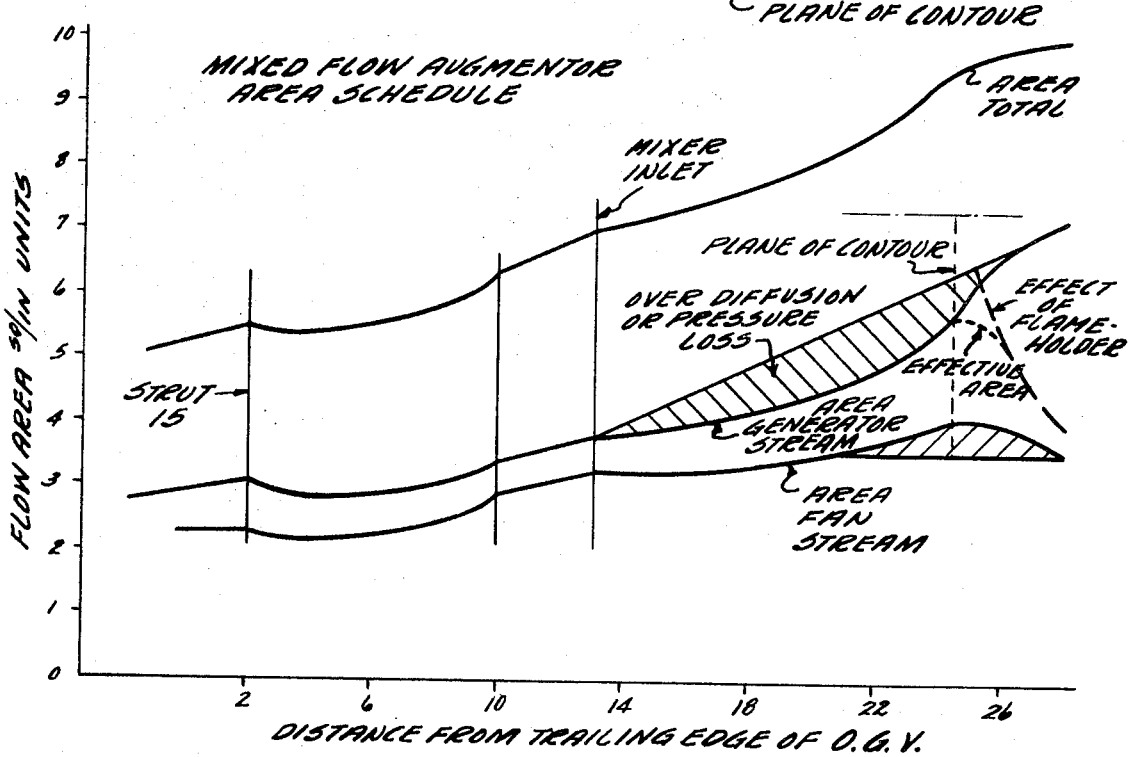

INVENTORS
JOHN W. VDOVIAK
SAMUEL A. BELK
BARRY WEINSTEIN

BY- Harry C. Burgess
ATTORNEY

MIXED FLOW AUGMENTATION SYSTEM

The present invention relates to a thrust augmentation system for a reaction engine and, in particular, to a mixed flow augmentation system for a turbofan engine.

A well known type of prime mover for propelling vehicles, such as aircraft, is an engine wherein a stream of hot exhaust gases issuing from the rear of the engine propels the vehicle by reaction of the hot gas stream, or "jet" upon the vehicle through the engine fixed therein. A common form of jet engine is an axial flow gas turbine known as a "turbojet" wherein air is compressed in a rotating compressor, mixed in a combustion chamber with fuel and the fluid mass expanded by burning. The hot motive fluid from the combustion chamber flows axially through a power turbine mounted on the same shaft as the compressor to cause it to rotate, the hot exhaust gases thereafter passing out through the engine tailpipe to provide the propulsive jet. In a turbojet no excess power (other than that required to drive the compressor) is supplied by the turbine.

Another form of gas turbine jet engine is the turbofan, sometimes called a "by-pass" engine. Examples of this type of engine are shown in the Patents to Whittle — No. 2,405,919 — and Godsey — No. 2,404,954. Such engines usually comprise a cylindrical duct or casing spaced concentrically about a conventional turbojet engine to provide an annular by-pass gas passage. The inlet to the inner gas generator (turbojet) is typically located downstream of the outer duct inlet and provision may be made for at least the early stages of the compressor to extend across both ducts. This forward portion of the compressor, sometimes called the fan, provides increased engine mass airflow, without an appreciable increase in engine weight or fuel flow, and, thus, is a form of thrust augmentation. The "cold" and "hot" streams emerging from the fan or by-pass duct and the inner gas generator duct, respectively, may be merged somewhere upstream of the outlet of the turbofan engine before exiting as a mixed flow stream.

It is also customary in jet engines for use in aircraft design to fly at transonic and supersonic speeds to provide an additional means of thrust augmentation sometimes termed "reheat." Thus, it is known that after the hot fuel/air mixture has passed through the main gas generator cycle, there remains some additional thrust potential since not all the available oxygen has been consumed. Therefore, with the addition of more fuel and provision of means for igniting the enriched fuel-air mixture in the engine tailpipe, additional thrust may be realized. However, in the by-pass or turbofan engine mixed flow augmentation presents certain problems for the engine designer. For example, the presence of dual high velocity concentric flow streams makes it difficult to ensure sufficient combustion of both streams, with low pressure loss, as well as providing efficient mixing and combustion stability, along with optimum flow matching and pressure equalization. While other flow mixing principles have also been applied to by-pass or turbofan exhaust mixing, such as axially-extending, elongated, perforated duct means separating the streams, it is known that by-pass engine augmentation may be enhanced by the use of the so-called "daisy chute" mixing principle. An example of a type of "daisy chute" mixer is shown in the Patent to Lloyd — No. 2,426,833 — wherein a circular member, having inner walls deeply corrugated, i.e., star-like in cross-section, provides alternating fluid streams in an interdigited relationship flowing through and out of the member. Use of a daisy chute type mixer can, however, create serious problems of added weight and gas pressure losses when inserted in the exhaust stream such that the use thereof would be prohibitive from an engine performance standpoint. Thus, unless particular attention is paid to the aero-thermodynamic design of a daisy chute mixer in a flow augmentation system to ensure, for example, that the length and weight of the device is held to a minimum, undue pressure loss penalties or low combustion efficiency can result. The design problem can be further complicated where it is desirable to provide a mixed flow augmentation system wherein the thrust level must be continuously modulated from a low temperature rise initial light-off of the augmentation system — to prevent fan "stall" — to maximum reheat with smooth operation, i.e., no sudden "thrust jump" which can result in damage to the engine or aircraft, if severe.

It is, therefore, a general object of the present invention to provide an improved mixed flow thrust augmentation system for use with a turbofan or by-pass type gas turbine engine.

A more specific object of the invention is to provide a mixed flow thrust augmentation system utilizing an improved daisy chute type mixer of short, compact and lightweight design providing lower gas stream insertion (pressure) losses.

Another object of the subject invention is to provide a mixed flow augmentation system for a turbofan engine utilizing a daisy chute mixer having an improved hot gas flow blockage or flameholding arrangement to ensure optimum flow diffusion ratios to increase system efficiency.

Still another object of the subject invention is to provide a mixed flow augmentation system utilizing a daisy chute mixer wherein static pressure balancing or matching of the by-pass and gas generator streams at the mixer exit is controlled for greater combustion stability, efficiency, and lower overall system pressure losses.

A further object of the invention is to provide a thrust augmentation system utilizing a daisy chute mixer having improved flow matching and flow equalization characteristics, in addition to improved mechanical reliability, in combination with a staged fuel injection system providing smooth, wide fuel flow (thrust) modulation from light-off of the augmentor to maximum reheat operation.

Briefly stated, one embodiment of our invention comprises thrust augmentation means for a turbofan engine having a by-pass duct and a gas generator spaced within the by-pass duct including a first plurality of contoured diffusion passages in flow communication with the by-pass duct, a second plurality of contoured diffusion passages in flow communication with the gas generator, the passages of the first and second pluralities being interspersed in circumferential alternation about the axis of the engine with the passage walls common to both of the pluralities being configured so that (1) upstream of a plane of contour the flow area of each passage of both pluralities is continually increasing in a downstream direction, (2) *downstream* of the plane of contour the nominal flow area of each passage of the *second* plurality is increasing at a greater rate per unit length than upstream of the plane, and (3) the flow area of each passage of the *first* plurality substantially decreases *downstream* of the plane in direct proportion to the nominal flow area change of the passages of the second plurality downstream of the plane. A plurality of radial flameholders are located within the passages of the second plurality so that the plane of maximum aerodynamic flow blockage is co-planar with the plane of static pressure balancing between the by-pass and gas generator streams. An additional circumferential flameholder provides cross-firing of the radial flameholders. Also provided are sequentially additive staged fuel injection means for injecting fuel locally of the circumferential flameholder member for initial augmentation, locally of the radial flameholders for intermediate power requirements, and uniformly substantially upstream of the plane of the radial flameholders for maximum power.

The features of our invention which we believe to be novel are set forth with particularity in the appended claims. The invention itself, however, both as to its organization and method of operation, together with further objects and advantages thereof, may be best understood by reference to the following detailed description and the accompanying drawings in which:

FIG. 3 is a view taken along the line 3—3 of FIG. 1;

Figure 1:
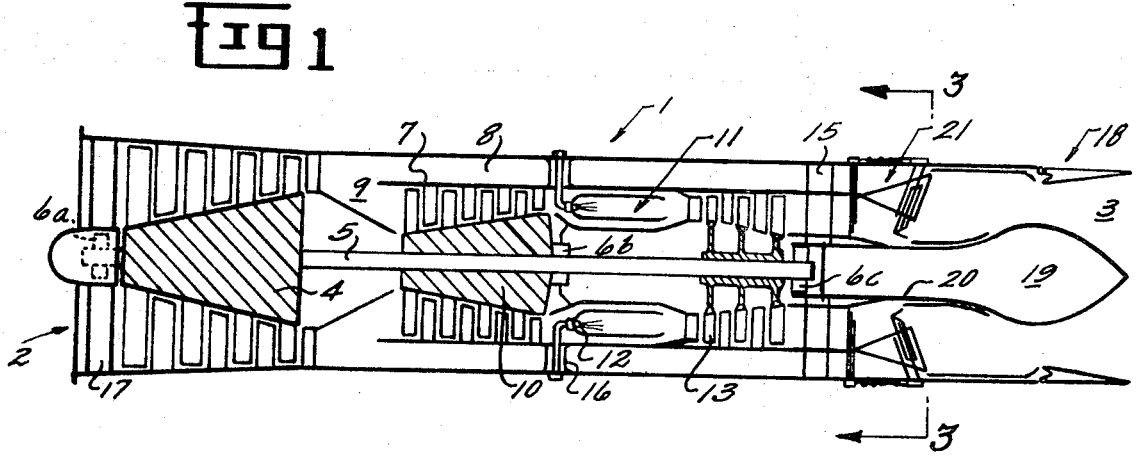
FIG. 1 is an axial cross-section view of a by-pass or turbofan jet engine utilizing the subject invention.
Figure 2:
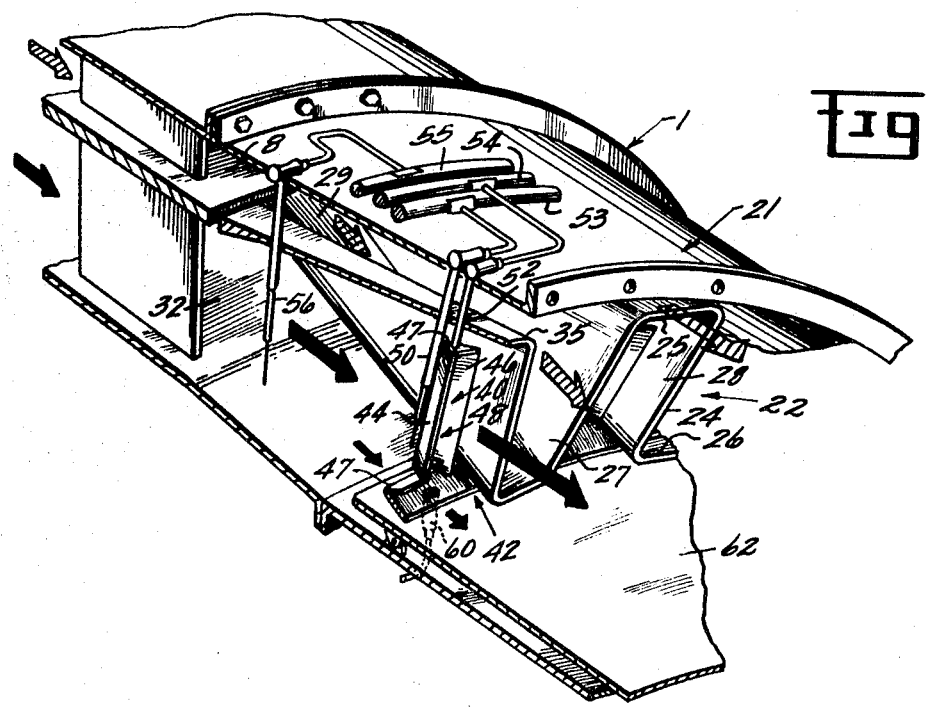
FIG. 2 is a partial perspective of the embodiment of the mixed flow thrust augmentation and staged fuel injection means shown in FIG. 1.
Figure 7:
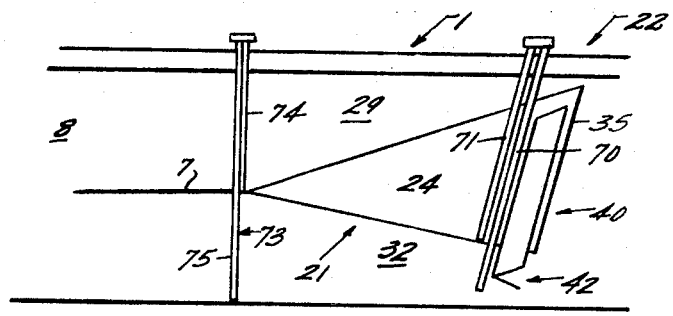
Figure 8:
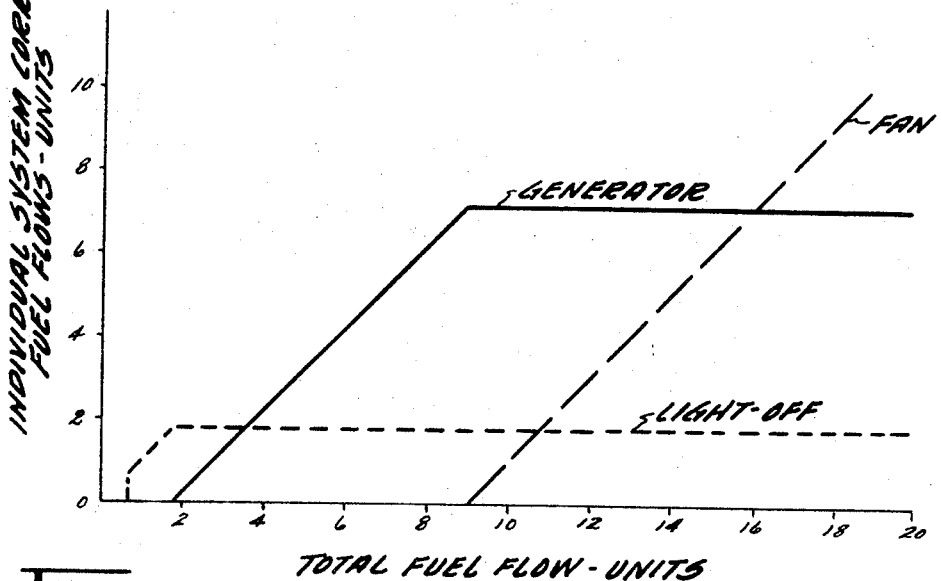

FIGS. 4a, 4b, and 4c are enlarged cross-sectional, partial views of the mixed flow augmentation means of the subject invention in schematic form together with known prior art devices included for comparison purposes;

FIGS. 5a and 5b are partial schematic plan views of the adjacent by-pass and hot gas generator passages of the improved daisy chute mixer of the subject invention illustrating the particular contouring of the common passage walls thereof and the location of the radial flameholder means with respect to the plane of contour;

FIG. 6 is a graph illustrating the flow area variation in the passages of the daisy mixer embodiment of FIG. 1, and further illustrating the effect of locating the radial flameholder as shown also in FIGS. 5a and 5b;

FIG. 7 is a schematic view of the location of the staged fuel injection means of the subject invention in another embodiment thereof; and FIG. 8 is a graph illustrating total fuel flow in units per time in the augmentation system of the invention and indicating various combinations of the sequentially additive system, shown in FIGS. 1, 2 and 7;

Turning now more specifically to the drawings, shown in FIG. 1 is a cross-sectional view of an axial flow gas turbine engine of the by-pass or turbofan type, although it will be understood that the invention could find equal utility in other types of reaction or jet engines having requirements for mixing dual flow streams of motive fluid. Thus, the engine comprises an outer or by-pass duct indicated generally at 1, having a forward inlet opening area 2 and an outlet or engine tailpipe exhaust area at 3. Within the outer or by-pass duct of this axial flow jet engine and located just aft of the inlet area 2 is a forward or low pressure compressor 4. It will be noted that the forward compressor extends across the outer duct inlet area and thus will act to raise the pressure, and temperature, of all the air entering the engine. The forward compressor is mounted on a shaft 5 which is supported on bearings indicated at 6a, 6b and 6c. Located at the rear, i.e., downstream, of the forward compressor is an inner gas generator duct 7 which in combination with the spaced concentric duct 1 forms a by-pass flow passage 8 for the forward compressor or "fan" air. Part of the compressed air from the forward compressor or fan enters the inlet area 9 of the gas generator duct where it is further compressed by the gas generator compressor 10. The highly compressed air then enters the combustion chamber area indicated at 11 where it is burned with fuel injected through suitable main fuel injection means 12. The hot gaseous mixture thereafter passes through the power turbine 13 also mounted on shaft 5. Work to power the rotating compressors is removed from the stream by the power turbine, which may comprise three stages or wheels, as shown, although more or less than the three described could be utilized depending on the engine requirements. The hot gas generator gases exit from the power turbine passing around the faired strut or frame members 15 which support the bearings 6c. These struts are part of the turbine rear frame structure which extends across both the by-pass duct and the hot gas generator stream and, thus, the struts will have an aerodynamic shape. Other strut or frame members 16 and 17 are located in the area of the bearings 6b, 6a respectively, to help support the rotating members and the inner gas generator duct in a known manner. The exhaust discharge or exit 3 is typically made variable in area by suitable nozzle means indicated generally at 18. It may be desirable also to provide an annular or plug type nozzle having an inner, bulbous member indicated at 19. The plug member may be supported by a long shaft or extension 20 mounted to the turbine rear frame. Indicated generally at 21 is a diffuser section, wherein the exhaust gas velocity is decreased in both air streams simultaneously — with a concommitant rise in static pressure — and wherein the novel mixed flow thrust augmentation system of the subject invention, now to be described, is located.

Turning now to FIG. 2, which is an enlarged partial perspective view of the mixed flow augmentor system, the large solid arrows illustrate the flow path of the hot gas generator stream. The large cross-hatched arrows, on the other hand, indicate the flow path from the cold by-pass passage. Reference to FIG. 3, as well as FIG. 2, will make it clear that the hot and cold streams are thus interspersed in circumferential alternation around the axis of the jet engine. The hot gas generator and the cold by-pass flow passages are formed by a convoluting, continuous wall member, indicated generally at 22, having a common passage wall 24 between adjacent hot and cold streams joined by generally laterally extending wall portions 25 at the outer periphery of the member 22 and similar wall portions 26 at the inner periphery thereof. This configuration provides a series of alternating cold and hot lobes or passages 27 or 28, respectively, somewhat akin to the so-called daisy chute mixer described above. Thus, it will be seen that the by-pass air enters the passages 27 through an upstream inlet 29 in communication with the by-pass duct 8. On the other hand, flow from the hot gas generator stream enters the mixer 22 at the open upstream area 32, with both the hot and cold streams exiting over the mixer lip or edge 35 at its downstream end. The described embodiment also provides an outer annulus of cooling air flow over the outer lateral wall 25, as indicated by the small cross-hatched arrows. This airflow serves to cool both the laterally extending wall which contains the combustion gases and the adjacent diffuser casing section. Inwardly of the laterally extending wall portions 26 at the inner periphery of the member 22 there is provided an annular hot stream indicated by the small solid arrows. This is useful for initial low thrust augmentation, as hereinafter described.

To obtain desired reheat or thrust augmentation, means must be provided for injecting additional fuel into the motive fluid downstream of the main gas generator and igniting same. One embodiment of our invention includes a three stage fuel injection system. The system includes a plurality of radially-extending flow blockage means or flameholders indicated generally at 40 located *completely* within the hot gas generator flow passages 28. The radial flameholders 40 are in communication with a circumferential or annular flameholder means indicated at 42 located in the inner annular hot gas stream — depicted by the small solid arrows — for purposes of cross ignition. The flameholders or flow blockage means 40 and 42 typically comprise diverging substantially flat wall portions 44 and 46 meeting at an upstream apex 47 to provide a recirculation zone, generally indicated at 48, substantially encompassed by the diverging wall portions. The staged fuel injection system shown in the drawings also includes a first fuel injection means 50 located just upstream of the apex of the flameholder and extending radially inward to inject fuel locally, (i.e., immediately upstream of the apex) of the circumferential or annular flameholder 42. A second fuel injection means 52 is shown extending generally parallel to the first fuel injection means and on the inside (downstream of the apex) of the radial flameholder means 40. Fuel injected from the second fuel injection means therefore determines the fuel/air ratio in the recirculation zone 48 of the radial flameholder. The first fuel injection means could be located otherwise than as shown but in the position depicted, i.e., just forward of the radial flameholders, the blockage of the hot gas generator stream is substantially unaffected. This arrangement also simplifies connection of the first and second fuel injection means to annular fuel manifolds 53 and 54, respectively, placed around the duct or casing 1 in zone 21. Located adjacent the aforementioned fuel manifolds is a third manifold 55 which supplies fuel to the third fuel injection means 56 of the three staged fuel injection system of the invention. The third fuel injection means is located substantially upstream of the radial and annular flameholder means, that is, at the entrance of the mixer member 22. This arrangement enables fuel injection to be uniformly distributed in the hot gas generator duct for higher engine power requirements, as hereinafter more fully explained. Finally, ignition means in the form of an igniter or spark plug, indicated in dotted lines at 60, is supplied to initiate light-off of the combustion fluid in the thrust augmentor. In the arrangement shown in FIG. 1, wherein an annular plug nozzle is used, the plug nozzle support member 20 may be shielded by an annular member 62 from the effects of the hot gas stream.

FIG. 3 is included to indicate the relative placement and lateral arrangement of the hot and cold streams. Note that the annular flameholder 42 is operable to cross-fire the radial flameholders. Further, the cold stream width is substantially equal to that of the hot streams, which will facilitate better mixing and, hence, improve performance at higher by-pass ratios (i.e., the ratio of the cold air mass flow to the gas generator fluid mass flow in the turbofan).

Certain of the advantages over known devices presented by our invention in the areas of combustion stability in a turbofan reheat system, reduction of weight and complexity of the mixer device, and greater control over the gas generator stream diffusion ratio, are perhaps made more significant in the schematic drawings and graphs of FIGS. 4 and 6. As stated above, an object of our invention is to provide a mixed flow augmentation system utilizing an improved daisy chute type mixer of compact design to reduce pressure (insertion) losses over known designs, for example, by an arrangement which permits a decrease in the length of the mixer. FIGS. 4a–4c indicate areas of improvement by the contrast between the arrangement of the present invention — FIG. 4a — and certain arrangements combining one or more known devices, as illustrated in FIGS. 4b and 4c. Specifically, the drawings illustrate the particular placement of the radially-extending flameholders 40 with respect to the end or lip 35 of the mixer member 22. It is known to be advantageous to place flame stabilizing means in the hot gas stream only of a dual flow (by-pass and hot gas generator) mixing device to achieve a low pressure (insertion) loss, stable combustion (particularly at low operating pressures) and efficient control at the lower power requirements, since the amount of flameholder stream blockage needed for stabilization is inversely proportional to inlet temperature and directly proportional to pressure drop, that is, smaller and less weighty members can be utilized when they are placed in the high temperature stream. Further, as stated above, daisy chute type mixers can provide relatively high efficiency mixing in a relatively short length. Nevertheless, the known prior art devices suffer from certain disadvantages. For example, the arrangement of FIG. 4b does not segregate the by-pass and gas generator flows up to the mixer exit, as does our arrangement, as shown in FIG. 4a. Thus, the known device permits premature dilution of the hot and cold streams prior to fuel injection, which adversely affects combustion stability. This is not allowed in the present invention. Furthermore, placing the flameholder means *within* the mixer, as in FIG. 4a, provides more efficient flow distribution over the entire radial height of the mixer, which is not possible with the designs of FIGS. 4b and 4c.

More importantly, however, the arrangement of our invention permits fan and gas generator stream static pressure balancing at the maximum *aerodynamic* width of the flame blockage. This is slightly aft of the physical maximum width of the flameholder, that is, just downstream of the mixer exit. This provides a much more well defined matching plane than heretofore has been possible. Improved flow matching, that is, static pressure balancing of the two streams (where static pressure refers to the pressure within the stream other than that provided to it by the velocity component of the molecules thereof), minimizes back pressure, in particular, on the fan or by-pass stream. This in turn enhances mixing efficiency and efficient operation or control of the operating limits of the fan or forward compressor. This is made possible with our invention since flow matching will occur — with the arrangement of FIG. 4a — *prior to* encountering heat addition losses in the gas streams due to combustion. That is, little, if any, effective combustion will occur in the hot gas stream prior to the flow reaching the exit plane of the mixer *and* in the area of maximum aerodynamic flow blockage. In addition, it will be noted that the known arrangement of FIG. 4b presents an obvious attendant disadvantage of increased weight pressure losses by reason of the spacing of the mixer from the inner duct to accommodate the annular upstream mixing gap. More importantly, however, the conventional arrangement of FIG. 4 b suffers from the requirement that static pressure be balanced at *two* locations, i.e., at the annular gap and at the mixer exit. As pointed out hereinabove, at different flight speeds by-pass and gas generator flow conditions will vary. For example, at higher flight Mach numbers, the by-pass ratio will be higher than at lower speeds. Thus, matching at two locations would require flow shifting at the mixer inlet and acceptance of greater losses, since flow shifting will cause separation losses.

On the other hand, the arrangement of FIG. 4c illustrates means whereby static pressure balancing of the by-pass and gas generator streams occurs at or immediately downstream of the mixer exit. This, however, has also shown to be undesirable since there ideally should be no dilution of the hot stream at the flameholder or flow blocking region or combustion inefficiency will result. More specifically, the gases exiting from the mixing device will be in a turning flow field due to the direction given by the diasy chute mixer walls and due to the blockage effect of the flow stabilizing means. Establishing the desired static pressure balance for such a flow system is difficult if not impossible, particularly under changing flight conditions. To achieve some measure of control, therefore, it has been customary to move the flameholders aft (see solid line position in FIG. 4c). However, this requires additional length of the diffuser and mixer, since additional gas generator flow area will be required to achieve the necessary static pressure balance, with a resultant larger *total* flow area at the matching or static pressure balancing plane. If, on the other hand, the flame stabilizing devices are moved considerably downstream of the mixer, they will be located in an area where the streams are substantially intermixed. Little or no control over augmentation stability is possible at this point, however, due to the fact that intermixing is usually accompanied by some turbulence unless, of course, the mixing duct is extremely long in length. Even in the latter situation, where the cold and hot flows may possibly stratify over the flow area of the exhaust duct, to attempt to place the stabilizing means within certain strata, particularly where the engine must operate under different flight conditions and with changing by-pass ratios, is very difficult. Thus, our invention situates the maximum *aerodynamic* flow blockage area not only upstream of the mixing area but co-planar with the plane of static pressure balancing, which, with the configuration disclosed herein, may be controlled extremely well as to location.

FIGS. 5a, 5b and 6 are included to emphasize the unique contouring of the hot and cold flow passages in the improved mixer 22 of our thrust augmentation system. It will be noted that starting at a "plane of contour", the common passage walls 24 are contoured around the flameholders 40 to obtain maximum diffusing rates, i.e., shorter diffuser length in the mixer. Thus, the radial flameholders are located downstream of the plane of contour and in the area of "shared" diffusion, i.e., in the flow passage area where the common wall 24 diverges or enlarges the nominal flow area of the hot stream passage 28 about the flameholder, at the same time decreasing, or converging, the flow area of the cold air or fan passageway 27. An additional benefit of our arrangement, therefore, is reduction of the flow area expansion requirement for the gas generator stream since the gas generator stream total (nominal) area is increased rapidly about the flameholders. This arrangement also provides aerodynamic acceleration of the gas generator stream and, further, reduces the overall mixer diffusion ratio.

It is known that control of the velocity of the gas flow in the area of the flameholder or stabilizing member can result in improved combustion stability. Contrary to known arrangements, however, whereby the static pressure balancing between the by-pass and gas generator streams occurs ahead of the flameholder (although the flameholder itself may be upstream of where the hot and cold stream start to mix, e.g., FIG. 4c), control of flow velocity past the flameholder is more easily obtained with our invention. In other words, it can be shown that flow velocity over the flameholder will depend on how well the static pressure balance has been accomplished. Thus, the known prior art devices suffer from less direct control over the flameholder lip velocity since in the known arrangements the lip velocity is made completely dependent on static pressure balancing. As pointed out, with changing flight demands, there will be less control over combustion stability, i.e., less efficient use of the reheat fuel for thrust augmentation. It should therefore be clear that with the maximum flameholder wake diameter positioned as shown in FIG. 5, that is, right at the mixer exit plane as a result of placement of the flameholders as shown in FIGS. 1, 2 and 5a, there is provided a much more efficient thrust augmentation system than has heretofore been possible.

FIG. 6 further illustrates the design of our improved mixer. Specifically, the graph shows that the *nominal* flow area of the hot gas generator passage 28 is increasing upstream as well as downstream of the plane of contour (although *effectively* the area increases up to the plane of contour and then decreases due to the blockage of flow by the flameholder means 40) and that the flow area of the by-pass or fan passages 27 is increasing up to plane of contour and thereafter (except for an insignificant increase) decreases. The combined or total area of both streams, of course, increases. This arrangement, which we have termed "shared diffusion", is effective to prevent the over-diffusion and attendant pressure loss which can occur in the conventional mixer wherein the contour of the walls is such that the actual flow area of the hot gas generator stream is continually increasing to the mixer exit and the fan stream area is also constant (increasing) as shown in FIG. 6 (shaded areas). An additional benefit from the contoured common passage wall 26 is greater mechanical stability in the mixing device. This is important since a high Mach turbofan engine could suffer from severe vibratory stresses were the mixer walls flat along their entire axial length.

FIG. 7 shows a different embodiment of the three staged fuel injection means of the invention. In this case, both the light-off or initial thrust augmentation fuel injection means and the radial fuel injection means are placed outside the radial flameholders 40. Thus, a first injection means 70 is placed immediately upstream of the apex of the radial flameholder 40 and extending inwardly to the annular space occupied by the circumferential flameholder 42. A second fuel injection means 71 is placed just upstream of the apex of the radial flameholders and alongside the first means 70. A third fuel injection means, generally indicated at 73, placed upstream of the mixer is adapted to provide uniform fuel injection into the mixer. An outer portion 74 of the reheat fuel injection means 73 may be used to inject fuel into the fan stream in conjunction with or sequentially to the fuel injected into the gas generator stream through an inner portion 75. The reason for this is that it has been learned that for by-pass ratios up to approximately 1.25 all the fuel can beneficially be injected into the gas generator stream only, for fuel system simplicity. However, for by-pass ratios above 1.25 it has been found advantageous to add fuel in the fan stream to improve the rate of fuel/air mixing.

FIG. 8 is a fuel schedule graph illustrating total fuel flow in pounds per hour in the three stage system disclosed in FIGS. 1 and 2. Thus, initial light-off of augmentation is indicated by the lower line with gas generator fuel injection shown by the second line. Finally, with addition of the fuel flow from the third or uniform fuel injection means, the total fuel flow rises still further, as indicated by the third line. The three staged fuel injection means may be operated sequentially or selectively as desired, except that the initial augmentation or light-off flow from the first fuel injection means will always be utilized.

It will be understood that other modifications of the subject invention as would occur to those skilled in the art are intended to be included within the scope of the appended claims.

We claim:

1. In an axial flow reaction engine a mixed flow augmentation system comprising:
   a first plurality of motive fluid flow passages;
   a second plurality of motive fluid flow passages, the passages of said first and second pluralities having openings interspersed in circumferential alternation about the axis of the engine; and
   a plurality of radially-extending flow blockage members located entirely within the flow passages of said second plurality upstream of the openings thereof, wherein the plane of maximum aerodynamic flow blockage of said members is co-planar with the plane of static pressure balancing between the motive fluid streams of said first and second pluralities of flow passages, respectively, to facilitate flow mixing and combustion stability in said mixed flow augmentation system.

2. In an axial flow reaction engine a mixed flow augmentation system comprising:
   a first plurality of contoured fluid flow passages;
   a second plurality of contoured fluid flow passages, the passages of said first and second pluralities having downstream openings interspersed in circumferential alternation about the axis of an engine;
   and a plurality of radially-extending flow blockage members located entirely within the passages of said second plurality and downstream of a plane of contour in said second plurality of contoured fluid flow passages wherein walls common to both of said passage pluralities are configured so that upstream of said plane of contour the flow area of each passage of both pluralities is continually increasing in a downstream direction, and downstream of said plane of contour the nominal flow area of each of said second plurality of passages increases at a greater rate per unit length than upstream thereof and the flow area of each of said first plurality of passages is decreasing substantially in direct proportion to the area change in said second plurality so that the overall flow diffusion ratio of said mixed flow augmentation system is reduced and the length of the pluralities of fluid flow passages minimized by diffusion sharing between adjacent passages of said first and second pluralities.

3. In a reaction engine including bypass duct means and hot gas generator duct means spaced within said bypass duct means, a mixed flow augmentation system comprising:
   a first plurality of flow passages in communications with said bypass duct means;
   a second plurality of flow passages in communication with said hot gas generator duct means, the passages of said first and second pluralities having downstream openings interspersed in circumferential alternation about the engine axis;
   a plurality of radially-extending flow blockage members located entirely within the flow passages of said second plurality upstream of the openings thereof;
   a circumferentially-extending flow blockage member in communication with the inner ends of said radially-extending members and located in the path of a portion of the hot gas generator stream, wherein the plane of maximum aerodynamic flow blockage of said members is co-planar with the plane of static pressure balancing between the bypass and hot gas generator motive fluid streams of said first and second plurality of flow passages, respectively, to facilitate flow mixing and combustion stability in said mixed flow augmentation system.

4. In a gas turbine engine including bypass duct means and hot gas generator duct means spaced within said bypass duct means, a mixed flow augmentation system comprising:
   a first plurality of flow passages in communication with said bypass duct means;
   a second plurality of flow passages in communication with said hot gas generator duct means;
   a plurality of radially-extending flow blockage members located entirely within the flow passages of said second plurality;
   a circumferentially-extending flow blockage member in communication with the inner ends of said radially-extending members and located in the path of a portion of the hot gas generator stream, wherein the plane of maximum aerodynamic flow blockage of said members is co-planar with the plane of static pressure balancing between the bypass and hot gas generator motive fluid streams of said first and second pluralities of flow passages, respectively, to facilitate flow mixing and combustion stability in said mixed flow augmentation stream;
   and staged fuel injection means comprising:

first means for injecting fuel locally of said circumferential flow blockage member for augmentation light-off, and second means for injecting fuel locally of said radial flameholders for intermediate power requirements of said engine, said first and second fuel injection means being operable sequentially for smooth thrust modulation over a wide range of engine operating speeds.

5. In a gas turbine engine including bypass duct means and hot gas generator duct means spaced within said bypass duct means, a mixed flow augmentation system comprising:

a first plurality of flow passages in communication with said bypass duct means;

a second plurality of flow passages in communication with said hot gas generator duct means;

a plurality of radially-extending flow blockage members located entirely within the flow passages of said second plurality;

a circumferentially-extending flow blockage member in communication with the inner ends of said radially-extending members and located in the path of a portion of the hot gas generator stream, wherein the plane of maximum aerodynamic flow blockage of said members is co-planar with the plane of static pressure balancing between the bypass and hot gas generator motive fluid streams of said first and second pluralities of flow passages, respectively, to facilitate flow mixing and combustion stability in said mixed flow augmentation system;

and staged fuel injection means comprising:

first means for injecting fuel locally of said circumferential flow blockage member for augmentation light-off;

second means for injecting fuel locally of said radial flameholders for intermediate power requirements of said engine, and third means for injecting fuel uniformly substantially upstream of the plane of said radial flameholders in said contoured diffusion passages, said third means injecting fuel in said second plurality of contoured diffusion passages only for engine bypass ratios of up to approximately 1.25 and injecting fuel in both said second plurality and said first plurality of passages for bypass ratios above 1.25, said first, second and third fuel injection means being operable sequentially for smooth thrust modulation over a wide range of engine operating speeds.

6. In a gas turbine engine comprising bypass duct means and hot gas generator duct means spaced within said bypass duct means, a mixed flow augmentor system comprising:

a first plurality of flow passages in communication with said bypass duct means;

a second plurality of flow passages in communication with said hot gas generator duct means;

a plurality of radially-extending flow blockage members located entirely within the flow passages of said second plurality;

a circumferentially-extending flow blockage member in communication with the inner ends of said radially-extending members and located in the path of a portion of the hot gas generator stream, wherein said flow blockage members are located downstream of a plane of contour in said flow passage pluralities and walls common to both of said passage pluralities are configured so that upstream of said plane of contour the flow area of each passage of both pluralities is continually increasing in a downstream direction, and downstream of said plane of contour the nominal flow area of each of said second plurality of passages increases at a greater rate per unit length than upstream thereof and the flow area of each of said first plurality of passages is decreasing substantially in direct proportion to the area change in said second plurality so that the overall flow diffusion ratio of said mixed flow augmentation system is reduced and the length of the pluralities of fluid passages minimized by diffusion sharing between adjacent passages of said first and second pluralities.

7. In a turbofan engine comprising bypass duct means and hot gas generator duct means concentric to and within said bypass duct means, a mixed flow augmentation system comprising:

a first plurality of flow passages in communication with said bypass duct means;

a second plurality of flow passages in communication with said hot gas generator duct means;

a plurality of radially-extending flow blockage members located entirely within the flow passages of said second plurality;

a circumferentially-extending flow blockage member in communication with the inner ends of said radially-extending members and located in the path of a portion of the hot gas generator stream, wherein said flow blockage members are located downstream of a plane of contour in said flow passage pluralities and walls common to both of said passage pluralities are configured so that upstream of said plane of contour the flow area of each passage of both pluralities is continually increasing in a downstream direction, and downstream of said plane of contour the nominal flow area of each of said second plurality of passages increases at a greater rate per unit length than upstream thereof and the flow area of each of said first plurality of passages is decreasing substantially in direct proportion to the area change in said second plurality so that the overall flow diffusion ratio of said mixed flow augmentation system is reduced and the length of the pluralities of fluid flow passages minimized by diffusion sharing between adjacent passages of said first and second pluralities;

and staged fuel injection means comprising:

first means for injecting fuel locally of said circumferential flow blockage member for augmentation light-off; and second means for injecting fuel locally of said radial flameholders for intermediate power requirements of said engine, said first and second fuel injection means being operable sequentially for smooth thrust modulation over a wide range of engine operating speeds.

8. In a turbofan engine comprising bypass duct means and hot gas generator duct means concentric to and within said bypass duct means; a mixed flow augmentation system comprising:

a first plurality of flow passages in communication with said bypass duct means;

a second plurality of flow passages in communication with said hot gas generator duct means;

a plurality of radially-extending flow blockage members located entirely within the flow passages of said second plurality;

a circumferentially-extending flow blockage member in communication with the inner ends of said radially-extending members and located in the path of a portion of the hot gas generator stream, wherein said flow blockage members are located downstream of a plane of contour in said flow passage pluralities and walls common to both of said passage pluralities are configured so that upstream of said plane of contour the flow area of each passage of both pluralities is continually increasing in a downstream direction, and downstream of said plane of contour the nominal flow area of each of said second plurality of passages increases at a greater rate per unit length than upstream thereof and the flow area of each of said first plurality of passages is decreasing substantially in direct proportion to the area change in said second plurality, so that the overall flow diffusion ratio of said mixed flow augmentation system is reduced and the length of the pluralities of fluid flow passages minimized by diffusion sharing between adjacent passages of said first and second pluralities;

and staged fuel injection means comprising:

first means for injecting fuel locally of said circumferential flow blockage member for augmentation light-off;

second means for injecting fuel locally of said radial flameholders for intermediate power requirements of said engine, and third means for injecting fuel uniformly substantially upstream of the plane of said radial flameholders in said second plurality of contoured fluid flow passages, said third means being adapted to inject fuel in said second plurality of contoured fluid flow passages only for engine bypass ratios of up to approximately 1.25 and in both said second plurality and said first pluralies of passages for bypass ratios above 1.25, said first, second and third fuel injection means being operable sequentially for smooth thrust modulation over a wide range of engine operating speeds.

9. In a turbofan engine including bypass duct means and hot gas generator duct means concentric to and within said bypass duct means, a mixed flow augmentation system comprising:

a first plurality of flow passages in communication with said bypass duct means;

a second plurality of flow passages in communication with said hot gas generator duct means, the passages of said first and second pluralities having downstream openings interspersed in circumferential alternation about the engine axis;

a plurality of radially-extending flow blockage members located entirely within the flow passages of said second plurality upstream of the openings thereof;

a circumferentially-extending flow blockage member in communication with the inner ends of said radially-extending members and located in the path of a portion of the hot gas generator stream, wherein the plane of maximum aerodynamic flow blockage of said members is co-planar with the plane of static pressure balancing between the bypass and hot gas generator motive fluid streams of said first and second pluralities of flow passages, respectively, to facilitate flow mixing and combustion stability in said mixed flow augmentation system;

and staged fuel injection means comprising:

first means for injecting fuel locally of said circumferential flow blockage member for augmentation light-off;

second means for injecting fuel locally of said radial flameholders for intermediate power requirements of said engine, and third means for injecting fuel uniformly substantially upstream of the plane of said radial flameholders in said second plurality of contoured fluid flow passages, said first, second and third fuel injection means being operable sequentially for smooth thrust modulation over a wide range of engine operating speeds.

10. In a turbofan engine including bypass duct means and hot gas generator duct means concentric to and within said bypass duct means, a mixed flow augmentation system comprising:

a first plurality of contoured fluid flow passages in flow communication with said bypass duct means;

a second plurality of contoured fluid flow passages in flow communication with said hot gas generator duct means, the passages of said first and second pluralities being interspersed in circumferential alternation about the axis of said engine, wherein walls common to both of said passage pluralities are configured so that upstream of a plane of contour the flow area of each passage of both pluralities is increasing in a downstream direction, and downstream of said plane of contour the nominal flow area of each of said second plurality of passages increases at a greater rate per unit length than upstream thereof, and the flow area of each of said first plurality of passages is decreasing substantially in direct proportion to the area change in said second plurality;

a plurality of radially-extending flameholders located entirely within the passages of said second plurality, the plane of maximum aerodynamic flow blockage of said flameholders being co-planar with the plane of static pressure balancing between said bypass and said hot gas generator streams, said flameholders being located downstream of said plane of contour;

a circumferential flameholder in communication with the inner ends of said radial flameholders and in the path of a portion of said hot gas generator stream, the plane of maximum aerodynamic flow blockage of said circumferential flameholder being co-planar with the plane of static pressure balancing between said first and second passage pluralities;

and staged fuel injection means comprising:

first means for injecting fuel locally of said circumferential flow blockage member for augmentation light-off;

second means for injecting fuel locally of said radial flameholders for intermediate power requirements of said engine, and third means for injecting fuel uniformly substantially upstream of the plane of said radial flameholders in said second plurality of contoured fluid flow passages, said first, second and third fuel injection means being operable sequentially for smooth thrust modulation over a wide range of engine operating speeds.

* * * * *